US006609368B2

United States Patent
Dvorak et al.

(10) Patent No.: US 6,609,368 B2
(45) Date of Patent: Aug. 26, 2003

(54) AUTOMATIC DOWNSHIFT AND OVERRIDE CONTROL FOR A TRANSMISSION

(75) Inventors: Paul A. Dvorak, Sanford, NC (US); Chin T. Khaw, Apex, NC (US); Gabriel G. Khairallah, Carrboro, NC (US)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 09/873,516

(22) Filed: Jun. 4, 2001

(65) Prior Publication Data
US 2002/0178721 A1 Dec. 5, 2002

(51) Int. Cl.$^7$ .............................................. F16D 31/02
(52) U.S. Cl. .............................. 60/425; 60/427; 91/519
(58) Field of Search .......................... 60/425, 427, 484; 91/519

(56) References Cited

U.S. PATENT DOCUMENTS

| | | | |
|---|---|---|---|
| 3,421,389 A | * | 1/1969 | Fauchere .................... 60/484 |
| 3,744,344 A | | 7/1973 | Olsen et al. |
| 3,803,987 A | | 4/1974 | Knapp |
| 3,988,949 A | | 11/1976 | Weseloh et al. |
| 4,019,404 A | | 4/1977 | Schauer |
| 4,121,479 A | | 10/1978 | Schauer |
| 4,286,477 A | | 9/1981 | Meyerle et al. |
| 4,354,400 A | | 10/1982 | Baker |
| 4,429,593 A | | 2/1984 | Michael |
| 4,750,381 A | | 6/1988 | Kita et al. |
| 4,776,233 A | | 10/1988 | Kita et al. |
| 5,335,750 A | | 8/1994 | Geringer et al. |
| 5,820,508 A | | 10/1998 | Konig et al. |
| 5,865,700 A | | 2/1999 | Horsch |
| 5,888,162 A | | 3/1999 | Moeller et al. |
| 5,946,983 A | | 9/1999 | Brambilla |
| 5,992,145 A | * | 11/1999 | Mann et al. .................... 60/425 |
| 6,042,496 A | | 3/2000 | Lehle et al. |
| 6,090,005 A | | 7/2000 | Schmidt et al. |
| 6,139,458 A | | 10/2000 | Simmons |
| 6,318,235 B1 | * | 11/2001 | Allart et al. .................... 91/519 |

* cited by examiner

Primary Examiner—Edward K. Look
Assistant Examiner—Michael Leslie
(74) Attorney, Agent, or Firm—Diana L Charlton

(57) ABSTRACT

The present invention includes a hydrostatic transmission system that has a control device that is selectable to send a speed signal to a motor for driving an output at a predetermined speed. A controller is used to automatically permit the selected speed signal in response to a predetermined speed signal and predetermined input from a sensing device indicating that the output is being driven in a forward drive condition. The controller is also used to automatically override the selected speed signal in response to a predetermined speed signal and predetermined input from a sensing device indicating that the output is being driven in a reverse drive condition. This invention allows for the speed of the motor to be changed from a high speed to a low speed when the motor is driving the output in a reverse drive condition to achieve greater efficiency and control of a work machine.

18 Claims, 2 Drawing Sheets

AUTOMATIC DOWNSHIFT AND OVERRIDE CONTROL FOR A TRANSMISSION

TECHNICAL FIELD

This invention relates generally to a downshift and override control for a work machine utilizing a hydrostatic transmission having one or more motors and more particularly to automatically downshifting the one or more motors in response to input related to a parameter within the hydrostatic transmission.

BACKGROUND

Currently, hydrostatic transmissions are used for propelling a wide variety of machines, including, but not limited to, small tractors, combines, skid steer loaders, and wheel loaders, under low to high travel speed conditions. Advantages of the hydrostatic transmissions include efficiency at low speeds and ability to infinitely vary speed within the speed range under load without clutching. However, hydrostatic transmissions have been found to be inefficient at high travel speeds for operating certain functions of the work machine. For example, reverse track steering requires the highest torque capability from the hydrostatic transmission. A certain amount of torque is necessary when the work machine is traveling within the high speed range which reduces the torque availability for reverse track steering. Further, a control lever is used for directing the travel of the work machine in either a forward or reverse direction. It is sometimes beneficial to have increased modulation of the control lever when traveling in the reverse direction for improved operator control/performance. However, a certain amount of hydraulic fluid flow is diverted from the control lever when the work machine is traveling in the high speed range, thus reducing modulation capability of the control lever.

In order to overcome these concerns, it is well known to provide a two speed switch on the control lever located within a cab of the work machine. An operator may choose to reduce the travel speed of the work machine by manually operating the switch to actuate a two speed control valve for reducing the one or more motors to the low speed range. Alternatively, when the operator desires to increase the travel speed to the high speed range, the switch is manually operated to actuate the two speed control valve for increasing the one or more motors to the high speed range. As can be easily understood, such manually input by the operator may be inconsistent and cause inefficient operation of the work machine. Further, such manually input requires constant vigil by the operator to ensure that the most efficient speed range is selected which increases time and energy spent by the operator. Therefore, it would be beneficial to provide an automatic downshift control during certain work conditions, such as, reverse track steering or reverse drive along with the manual input capability.

The present invention is directed to overcome one or more of the problems as set forth above.

SUMMARY OF THE INVENTION

In one aspect of the present invention, a hydrostatic transmission system comprises a source of hydraulic fluid. A pump is used for pressurizing the hydraulic fluid. A motor group is connected with the pump for receiving the pressurized hydraulic fluid. The motor group has a defined speed range for driving an output in either forward or reverse directions. Means is connected between the pump and the motor group for controlling the displacement of the motor group. A control mechanism is used for determining the pressure of the hydraulic fluid and for directing the controlling means in response to a specific pressure determination that relates to the direction that the motor group is driving the output to selectively change the displacement of the motor group and achieve a predetermined speed within the speed range.

In another aspect of the invention, a method is disclosed for automatically changing the speed of a motor group having forward and reverse drive conditions. The motor group is located within a transmission system for a work machine. The method comprises the steps of determining whether the motor group is in the reverse drive condition and automatically changing the speed of the motor group from a high speed to a low speed in response to the reverse drive condition.

In yet another aspect of the invention, a hydrostatic transmission system for a work machine comprises a source of hydraulic fluid. A pump is used for pressurizing the hydraulic fluid. A motor group is connected with the pump for receiving the pressurized hydraulic fluid. The motor group has high and low speeds for driving an output in either forward or reverse directions. A control mechanism is used for determining when the motor group is driving the output in a reverse direction and for automatically changing the speed of the motor group to the low speed in response to the determination.

In yet another aspect of the invention, a hydrostatic transmission system for a work machine comprises a source of hydraulic fluid. A pump is used for pressurizing the hydraulic fluid. A motor group is connected with the pump for receiving the pressurized hydraulic fluid. The motor group has a defined speed range for driving an output in either forward or reverse directions. A control device is connected with the motor group and is selectable to send a speed signal to the motor group for driving the output at a predetermined speed within the speed range. A sensing device is disclosed. A controller is connected with the control and sensing devices and is used for sending a control signal in response to a predetermined speed signal and predetermined input from the sensing device to automatically override the selected speed signal from the control device.

The present invention includes a hydrostatic transmission that has a control device that is selectable to send a speed signal to a motor group for driving an output at a predetermined speed. A controller is used to automatically override the selected speed signal in response to a predetermined speed signal and predetermined input from a sensing device. This invention allows for the speed of the motor group to be changed from a high speed to a low speed when the motor group is driving the output in a reverse direction to achieve greater efficiency and control of a work machine.

DETAILED DESCRIPTION

Figure 1:
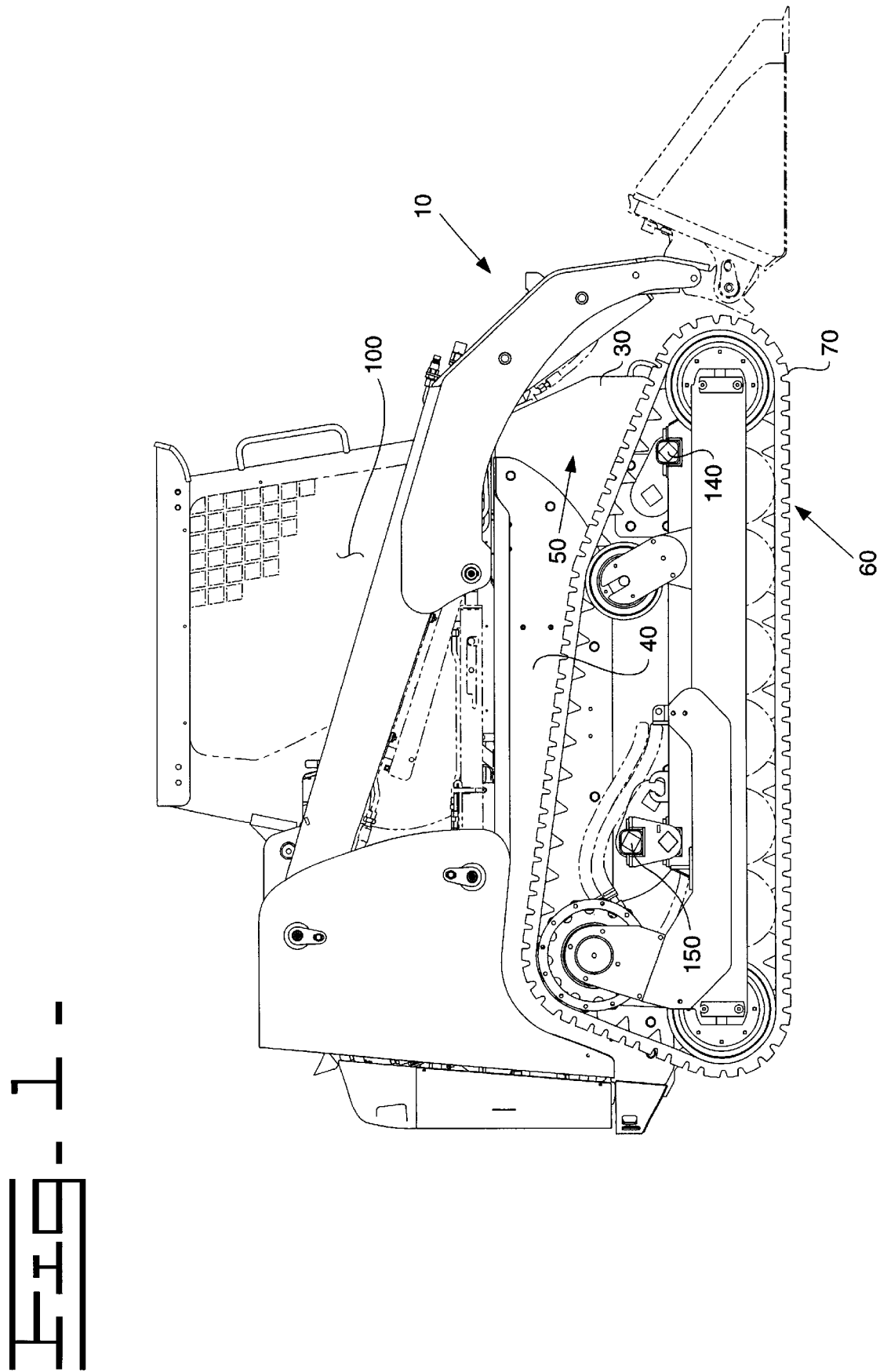
FIG. 1 is a perspective view of a work machine incorporating the present invention hydrostatic transmission system.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
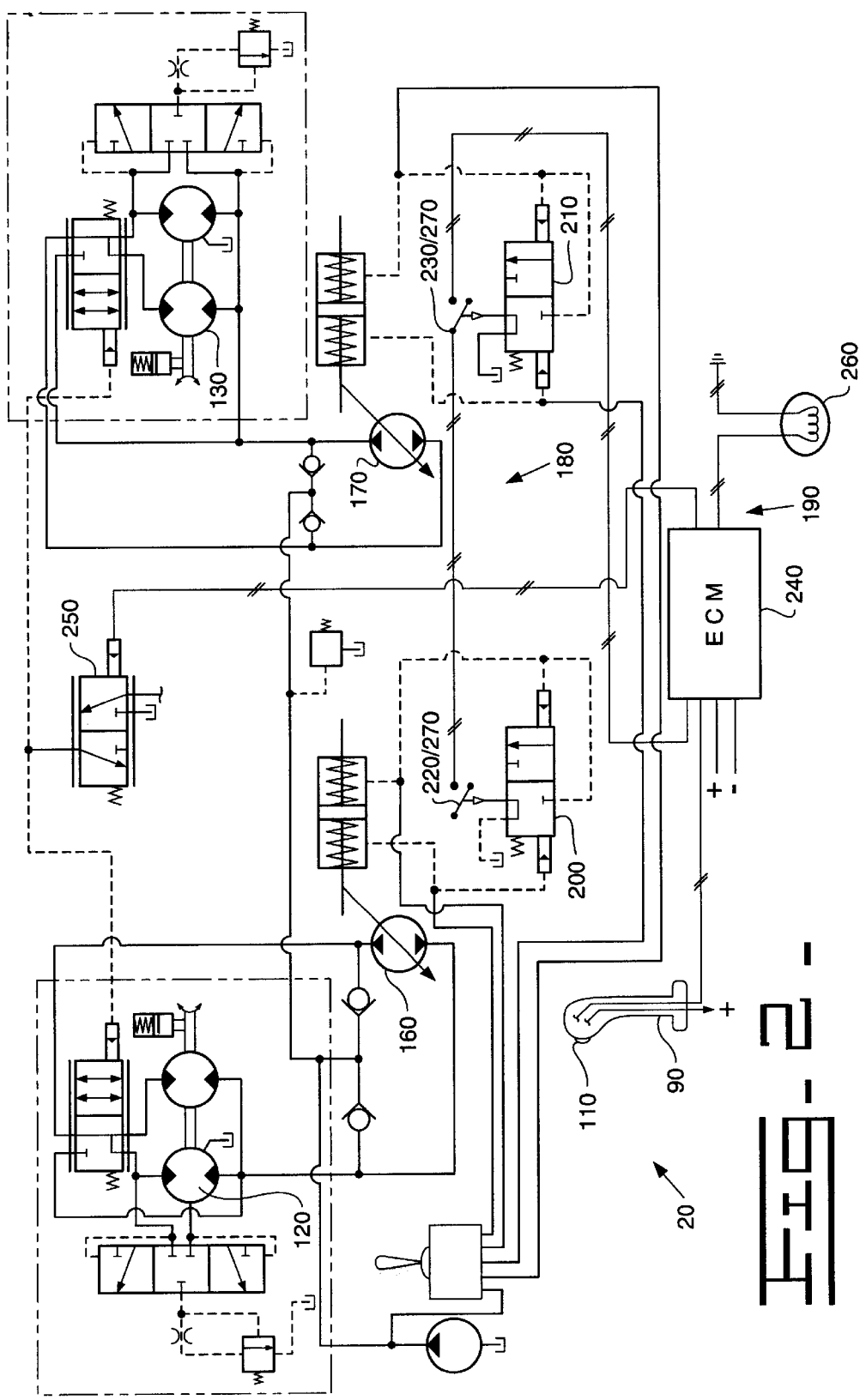
FIG. 2 is a schematic of the hydrostatic transmission system.

A work machine 10, such as, a track type skid steer loader, is shown in FIG. 1 and incorporates the features of the present hydrostatic transmission system 20 therein (seen in FIG. 2). The track type skid steer loader 10 is meant only to represent a wide variety of different machines that may incorporate the hydrostatic transmission system 20, including, but not limited to, tractors, wheel loaders, backhoe loaders, and the like. The work machine 10 includes a lower frame assembly 30 and an upper frame assembly 40 which are mounted together to define a main frame assembly 50 that is seated on an undercarriage assembly 60 that consists of connected right and left track assemblies, one of which is shown at 70.

Referring to the schematic of FIG. 2, the hydrostatic transmission system 20 is disclosed in more detail. A control device 90 such as a joystick, is used to control the travel of the work machine 10 via the undercarriage assembly 60 in a well known manner. The control device 90 is movable to a plurality of positions to move the work machine 10 in forward or reverse directions (fore/aft) in combination with steering capabilities to the left or right. The travel of the work machine 10 is controlled by an operator (not shown) from within an operator's compartment 100 (seen in FIG. 1). The control device 90 includes a two speed switch 110 thereon which is operable by the operator (not shown) to select either high or low speed for the work machine 10. A pair of two speed motors 120,130 are used to achieve high or low speed ranges HS,LS, respectively, and forward or reverse drive conditions FD,RD, respectively. The motors 120,130 are separated and control both the right and left track assemblies 700 of the undercarriage assembly 60 in a well known manner. A pump 160,170 is connected with a respective motor 120,130. The pumps 160,170 operate in a well known manner to pressurize hydraulic fluid within the hydrostatic transmission system 20 to drive the motors 120,130.

A control mechanism 180 is connected with the respective pumps 160,170 and motors 120,130 within the hydrostatic transmission system 20. The control mechanism 180 determines when the motors 120,130 are driving the axles 140,150 in a reverse direction and provides a method 190 to automatically and selectively change the displacement of the motors 120,130 in response thereto so that the low speed range LS is provided. The control mechanism 180 includes a resolver valve 200,210 connected with a respective pump 160,170 and movable between first and second positions, a pressure switch 220,230 connected with or disposed within a respective resolver valve 200,210 and an electronic control module (ECM) 240 in connection with the pressure switches 220,230. Although the control mechanism 180 includes separate components 200,210,220,230,240, it should be understood that the components may be combined in any suitable manner to achieve the same or similar results.

Controlling means 250, such as a two position control valve, is connected between the ECM 240 and the motors 120,130. The control valve 250 operates in a well known manner for controlling the displacement of the motors 120,130 in response to an output signal from the two speed switch 110 to obtain a predetermined speed within the high or low speed range HS,LS. The displacement of the motors 120,130 may be controlled within the motors 120,130 via an internal control means instead of the utilization of the external control valve 250. Also, it should be understood that the controlling means 250 may be any suitable type of valve capable of controlling the flow of hydraulic fluid. Further, the controlling means 250 may be obtained through orificing or other structural enhancements to control the flow of hydraulic fluid. The control valve 250 is positioned upstream of the control mechanism 180 so that the control mechanism 180 is positioned between the pumps 160,170 and the control valve 250.

The ECM 240 is capable of receiving input signals from the two speed switch 110 on the control device 90 and the pressure switches 220,230. The ECM 240 is capable of transmitting output signals to an indicator 260 and the control valve 250. It should be noted that the resolver valves 200,210 and the pressure switches 220,230 act as sensing means 270 for determining the pressure within the hydrostatic transmission system 20 in relation to the direction that the axles 140,150 are traveling. Therefore, it should be easily understood that sensing means of any suitable type capable of sensing a parameter with the hydrostatic transmission system 20 related to the direction of travel of the axles 140,150, such as, but not limited to, axle rotation, motor output rotation or pump flow sensors may be used for providing input signals to the ECM 240.

Industrial Applicability

During operation of the work machine 10, the operator (not shown) has the option of controlling the speed of the motors 120,130 through the two speed switch 110 located on the control device 90. It may be desirable to select a high speed HS for the motors 120,130 when the work machine 10 is traveling in the forward direction. However, when the work machine 10 is traveling in the reverse direction or utilizing reverse track steering, it is desirable to select the low speed LS of the motors 120,130 to increase the efficiency of the operation through greater modulation of the control device 90 in the reverse direction or greater torque availability for reverse track steering.

When the operator (not shown) operates the work machine 10 in the forward direction, both of the pumps 160,170 provide flow in forward. In this condition, the forward flow of the pumps 160,170 has a higher pressure than the reverse flow. Therefore, the higher pressure from the forward flow will actuate the resolver valves 200,210 to the first position. The first position of the resolver valves 200,210 opens the resolver pressure switches 220,230 so that an input signal is sent to the ECM 240. If the operator (not shown) selects either low or high speed LS,HS for the motors 120,130 via the two speed switch 110 on the control device 90, the ECM 240 sends an output signal to the control valve 250 to change the displacement of the motors 120,130 and permit operation at the selected speed.

When the operator (not shown) operates the work machine 10 in either the reverse direction or reverse track steering, one or both of the pumps 160,170 provide flow in reverse. In these conditions, the reverse flow of the pumps 160,170 has a higher pressure than the forward flow. Therefore, the higher pressure from the reverse flow will actuate one or both the resolver valves 200,210, respectively, to the second position. The second position of one or both of the resolver valves 200,210 provides zero pressure to one or both of the resolver pressure switches 220,230, respectively, so that no input signal is sent to the ECM 240. Therefore, if the operator (not shown) selects the low speed LS for the motors 120,130 via the two speed switch 110 on the control device 90, the ECM 240 will not send an output signal to the control valve 250 to change the displacement of the motors 120,130 and the low speed LS selected is maintained. In the same respect, if the operator (not shown) selects the high speed HS for the motors 120,130 via the two speed switch 110 on the control device 90, the second position of one or both of the resolver valves 200,210 provides zero pressure to one or both of the resolver pressure switches 220,230, respectively, so that no input signal is sent to the ECM 240. However, in this condition, the ECM 240 will send an output signal to the control valve 250 to change the displacement of the motors 120,130 and override the high speed HS selection to obtain the low speed LS.

Other aspects, objects and advantages of this invention can be obtained from a study of the drawings, disclosure and the appended claims.

What is claimed is:

1. A hydrostatic transmission system, comprising:
   a source of hydraulic fluid;
   a pump for pressurizing the hydraulic fluid;
   a motor group connected with the pump for receiving the pressurized hydraulic fluid, the motor group having a defined speed range for driving an output in either forward or reverse directions;
   means connected between the pump and the motor group for controlling the displacement of the motor group; and
   a control mechanism for determining the pressure of the hydraulic fluid and for directing the controlling means in response to a specific pressure determination that relates to the direction that the motor group is driving the output to selectively change the displacement of the motor group and achieve a predetermined speed within the speed range.

2. The hydrostatic transmission system of claim 1, wherein the control mechanism is positioned between the pump and the controlling means.

3. The hydrostatic transmission system of claim 1, wherein the controlling means is a control valve and the control mechanism includes a resolver valve, a pressure switch and an electronic control module.

4. The hydrostatic transmission of claim 1, wherein the defined speed range includes a high speed and a low speed and the controlling means selectively changes the displacement of the motor group to move from the high speed to the low speed when the motor group is driving the output in the reverse direction.

5. A method for automatically changing the speed of a motor having forward and reverse drive conditions, the motor group being located within a transmission system for a work machine, comprising the steps of:
   determining whether the motor group is in the reverse drive condition; and
   automatically changing the speed of the motor group from a high speed to a low speed in response to the reverse drive condition.

6. The method for automatically changing the speed of the motor group of claim 5, wherein the step of automatically changing the speed of the motor group includes the step of:
   changing the speed of the motor group without human interaction.

7. The method for automatically changing the speed of the motor group of claim 5, wherein the step of determining whether the motor group is in the forward or reverse condition includes the step of:
   measuring a parameter within the transmission system.

8. A hydrostatic transmission system for a work machine, comprising:
   a source of hydraulic fluid;
   a pump for pressurizing the hydraulic fluid;
   a motor group connected with the pump for receiving the pressurized hydraulic fluid, the motor group having high and low speeds for driving an output in either forward or reverse directions; and
   a control mechanism for determining when the motor group is driving the output in a reverse direction and at the high speed and for automatically changing the speed of the motor group to the low speed in response to the determination.

9. The hydrostatic transmission system of claim 8, wherein means is connected between the pump and the motor group for controlling the displacement of the motor group to achieve the high and low speeds of the motor group.

10. The hydrostatic transmission system of claim 8, wherein the reverse direction of the output indicates that the work machine is traveling in reverse or utilizing reverse track steering.

11. The hydrostatic transmission system of claim 8, wherein the control mechanism does not automatically change the motor group to the low speed when the motor group is driving the output in the forward direction.

12. A hydrostatic transmission system for a work machine, comprising:
   a source of hydraulic fluid;
   a pump for pressurizing the hydraulic fluid;
   a motor group connected with the pump for receiving the pressurized hydraulic fluid, the motor group having a defined speed range for driving an output in either forward or reverse directions;
   a control device connected with the motor group, the control device selectable to send a speed signal to the motor group for driving the output at a predetermined speed within the speed range;
   a sensing device; and
   a controller connected with the control and sensing devices for sending a control signal in response to a predetermined speed signal from the control device and predetermined input from the sensing device to automatically override the selected speed signal from the control device.

13. The hydrostatic transmission system of claim 12, wherein the control device sends a speed signal to the motor group for driving the output at either a high speed or a low speed within the speed range and the controller changes the displacement of the motor group when the input from the sensing device indicates that the motor group is driving the output in the reverse direction and the speed signal indicates that the high speed has been selected.

14. The hydrostatic transmission system of claim 13, wherein the control signal automatically overrides the high speed signal sent by the control device and lowers the speed of the motor group to the low speed through the displacement of the motor group.

15. The hydrostatic transmission system of claim 13, wherein when the motor group is driving the output in the reverse direction and at the low speed no input is sent to the controller so that the low speed selected by the control device is maintained.

16. The hydrostatic transmission system of claim 13, wherein when the motor group is driving the output in the forward direction and at either the high or low speed an input is sent to the controller to obtain the speed selected by the control device.

17. The hydrostatic transmission system of claim 13, wherein a control valve is connected between the pump and the motor group for receiving the control signal from the controller to change the displacement of the motor group.

18. The hydrostatic transmission system of claim 13, wherein the control device includes a two speed switch.

* * * * *